(12) United States Patent
Hagen

(10) Patent No.: US 9,447,755 B2
(45) Date of Patent: Sep. 20, 2016

(54) METHOD FOR OPERATING A FUEL SYSTEM, AND FUEL SYSTEM

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 377 days.

(21) Appl. No.: 14/129,728

(22) PCT Filed: Jul. 2, 2012

(86) PCT No.: PCT/EP2012/002772
§ 371 (c)(1),
(2), (4) Date: Dec. 27, 2013

(87) PCT Pub. No.: WO2013/000583
PCT Pub. Date: Jan. 3, 2013

(65) Prior Publication Data
US 2014/0137948 A1 May 22, 2014

(30) Foreign Application Priority Data

Jun. 30, 2011 (DE) ........................ 10 2011 106 008

(51) Int. Cl.
*F02M 25/08* (2006.01)
*B60K 15/035* (2006.01)
(Continued)

(52) U.S. Cl.
CPC .... *F02M 25/0836* (2013.01); *B60K 15/03519* (2013.01); *F02M 25/089* (2013.01); *F02M 37/0082* (2013.01); *B60K 6/20* (2013.01); *B60K 2015/0321* (2013.01); *B60K 2015/0358* (2013.01); *B60K 2015/03296* (2013.01); *B60K 2015/03302* (2013.01); *B60K 2015/03514* (2013.01); *Y10T 137/0379* (2015.04); *Y10T 137/0396* (2015.04); *Y10T 137/2627* (2015.04);
(Continued)

(58) Field of Classification Search
CPC .............. B60K 15/03519; B60K 2015/03302; B60K 2015/03296; B60K 2015/0358; F02M 25/0836; F02M 25/089; Y10T 137/0396; Y10T 137/86324; Y10T 137/7737; Y10T 137/0379; Y10T 137/7779; Y10T 137/2627
See application file for complete search history.

(56) References Cited

U.S. PATENT DOCUMENTS 4,117,718 A * 10/1978 Hayward ................ G01M 3/36
209/597
4,178,894 A 12/1979 Nau
(Continued)

FOREIGN PATENT DOCUMENTS

CN 201661388 12/2010
DE 43 10 452 10/1994
(Continued)

OTHER PUBLICATIONS

Chinese Search Report issued on Jul. 23, 2015 with respect to counterpart Chinese patent application 201280032233.9.
(Continued)

*Primary Examiner* — Atif Chaudry
(74) *Attorney, Agent, or Firm* — Henry M. Feiereisen LLC

(57) ABSTRACT

In a method for operating a fuel system of an internal combustion engine, the fuel system has a fuel tank and a ventilation device, which has at least one vent valve, for ventilating the fuel tank. The magnitude of deformation caused by an internal pressure of the fuel tank of a deformation zone of the fuel tank is ascertained and the vent valve is opened when the magnitude of deformation exceeds a limit value.

10 Claims, 12 Drawing Sheets

(51) Int. Cl.
  *B60K 15/03* (2006.01)
  *F02M 37/00* (2006.01)
  *B60K 6/20* (2007.10)

(52) U.S. Cl.
  CPC ....... *Y10T 137/7779* (2015.04); *Y10T 137/794* (2015.04); *Y10T 137/86324* (2015.04); *Y10T 137/87708* (2015.04)

(56) References Cited

U.S. PATENT DOCUMENTS

| | | | |
|---|---|---|---|
| 5,174,265 | A | 12/1992 | Sekine |
| 5,692,480 | A | 12/1997 | Kato et al. |
| 6,533,002 | B1 * | 3/2003 | Kobayashi ....... B60K 15/03504 141/198 |
| 7,152,587 | B2 * | 12/2006 | Suzuki ............... F02M 25/0809 123/518 |
| 7,828,008 | B1 * | 11/2010 | Beckman ............ F16K 37/0091 137/487.5 |
| 8,607,765 | B2 | 12/2013 | Hagen |
| 2003/0226596 | A1 | 12/2003 | Bolle et al. |
| 2009/0025694 | A1 * | 1/2009 | Shinagawa ...... B60K 15/03504 123/519 |
| 2010/0147847 | A1 | 6/2010 | Gebert |
| 2011/0284125 | A1 | 11/2011 | Hagen et al. |
| 2012/0085424 | A1 | 4/2012 | Hagen |
| 2012/0111307 | A1 | 5/2012 | Hagen |
| 2012/0152489 | A1 | 6/2012 | Hagen |
| 2012/0160218 | A1 | 6/2012 | Hagen |
| 2012/0160219 | A1 | 6/2012 | Hagen |
| 2012/0160220 | A1 | 6/2012 | Hagen |
| 2012/0168454 | A1 | 7/2012 | Hagen |
| 2012/0174894 | A1 | 7/2012 | Hagen |
| 2012/0175379 | A1 | 7/2012 | Hagen |
| 2012/0179354 | A1 | 7/2012 | Hagen |
| 2012/0180760 | A1 | 7/2012 | Hagen |
| 2012/0180767 | A1 | 7/2012 | Hagen |
| 2012/0186670 | A1 | 7/2012 | Hagen |
| 2012/0234074 | A1 | 9/2012 | Hagen |

FOREIGN PATENT DOCUMENTS

| | | |
|---|---|---|
| DE | 101 09 058 | 9/2002 |
| DE | 102 25 327 | 1/2004 |
| DE | 102007026817 | 10/2008 |
| DE | 102008062243 | 6/2010 |
| DE | 102009009901 | 8/2010 |
| DE | 102009057227 | 6/2011 |
| GB | 2 264 107 | 8/1993 |
| JP | 04-151332 | 5/1992 |
| JP | 2010-270652 | 12/2010 |

OTHER PUBLICATIONS

Translation of Chinese Search Report issued on Jul. 23, 2015 with respect to counterpart Chinese patent application 201280032233.9.
International Search Report issued by the European Patent Office in International Application PCT/EP2012/002772 on Sep. 27, 2012.

* cited by examiner

METHOD FOR OPERATING A FUEL SYSTEM, AND FUEL SYSTEM

CROSS-REFERENCES TO RELATED APPLICATIONS

This application is the U.S. National Stage of International Application No. PCT/EP2012/002772, filed Jul. 2, 2012, which designated the United States and has been published as International Publication No. WO 2013/000583 and which claims the priority of German Patent Application, Serial No. 10 2011 106 008.5, filed Jun. 30, 2011, pursuant to 35 U.S.C. 119(a)-(d).

BACKGROUND OF THE INVENTION

The invention relates to a method for operating a fuel system of an internal combustion engine, with the fuel system including a fuel tank and at least one ventilation device having a vent valve, for ventilating the fuel tank. The invention further relates to a fuel system.

Methods of the afore-mentioned type are known in the art. The respective fuel system is, for example, associated to a motor vehicle or a drive system of the motor vehicle. The drive system has hereby in particular at least one internal combustion engine and is configured, for example, as a hybrid drive system, i.e. has the internal combustion engine and at least one electric machine, with the internal combustion engine and the electric machine jointly generating a drive torque of the drive system at least temporarily. The internal combustion engine is supplied by the fuel system with fuel from the fuel tank. A volatile hydrocarbon fuel, for example gasoline, is oftentimes used as fuel. The fuel tank thus normally contains both a volume of liquid fuel and also a volume of gaseous fuel which accumulates in particular above the liquid fuel. The fuel tank may be a closed tank, in particular a pressure tank, or a partially closed, particularly also unpressurized, tank. The closed tank is used in particular to reduce emissions.

Due to fluctuations in the temperature of the fuel, caused for example by changes in the ambient temperature, pressure fluctuations may occur in the fuel tank. For this reason, the fuel tank is provided with a ventilation device to provide ventilation of the fuel tank so that excess pressure in the fuel tank can be reduced by the ventilation device. For this purpose, the ventilation device vents the fuel tank, for example via a vent line. During ventilation, both gaseous and liquid fuels can escape from the fuel tank through the ventilation device or vent line. The vented fuel thus is initially present as a mixture of gaseous and liquid fuels. This is particularly the case when ventilation of the fuel tank is carried out at high fuel tank internal pressure. In this case, high flow rates of vented fuel are encountered as a result of the high pressure or great pressure differential between the fuel tank internal pressure and the pressure outside of the fuel tank so that liquid fuel is entrained by the gaseous fuel.

The gaseous fuel may readily be supplied to the internal combustion engine or its intake system, and a fuel accumulator, preferably designed as a charcoal canister, can be arranged between the fuel tank and the internal combustion engine and associated to the ventilation device. The fuel accumulator is provided to temporarily store, i.e. receive, gaseous fuel, when gaseous fuel that is not needed is present and is to be fed back as soon as the gaseous fuel can be discharged into the internal combustion engine. However, liquid fuel must not migrate into the fuel accumulator or the internal combustion engine to avoid damage or malfunction.

For that reason, the ventilation device may have at least one separator, which is used for separation of gaseous and liquid fuels. The separator is thus provided to prevent transfer of liquid fuel from the fuel tank through the ventilation device into the internal combustion engine or fuel accumulator. The separator separates hereby liquid fuel and allows passage of gaseous fuel. The separated liquid fuel passes into a buffer of the separator. The term buffer is hereby not to be understood as the presence of an actual (temporary) storage of liquid fuel. Rather, liquid fuel can be discharged directly from the buffer or the separator, preferably in the direction of the fuel tank. This may, however, result in a rise of the fill level of the buffer, for example, when limiting the discharged volume flow, especially through a line cross-section or the like. The separated liquid fuel may thus at least temporarily not be expelled fast enough as it is introduced into the buffer. Of course, there is, however, the possibility to temporarily store the liquid fuel, for example for a specific period of time.

During operation of the fuel system, the amount of liquid fuel present in the buffer or separator should be prevented from exceeding a limit amount, i.e. the fill level of the buffer thus exceeds a limit fill level, as this can adversely affect the effectiveness of the separator. The risk that liquid fuel escapes again with gaseous fuel from the separator and is entrained in the direction of the fuel accumulator or internal combustion engine increases as the amount of liquid fuel in the buffer increases. For this reason, the fuel delivery device is associated to the separator and is used to convey liquid fuel from the buffer, in particular in the direction of the fuel tank. The fuel delivery device is usually designed as a suction jet pump, with fuel being frequently used as operating agent of the suction jet fuel and conveyed by a fuel pump of the fuel system from the fuel tank in the direction of the internal combustion engine.

In the known methods for operating the fuel system of the internal combustion engine, the fuel tank is normally ventilated by the ventilation device as a result of the fuel tank internal pressure and a temperature. This means that the vent valve of the ventilation device is set as a function of the fuel tank internal pressure and the temperature for ventilating the fuel tank. However, this is only possible when the internal combustion engine is activated, because only in this case is a control unit, associated to the internal combustion engine or the fuel system, being activated. This control unit is used to adjust the vent valve based on the particularly measured fuel tank internal pressure and the particularly measured temperature for ventilating the fuel tank. At standstill phases, i.e. when the internal combustion engine and thus the control unit are deactivated, the fuel tank internal pressure is normally limited by at least one mechanical overflow valve which is dimensioned for a typical pressure level. When the temperature changes in the fuel tank, for example from heat input by the internal combustion engine still warm from operation or by external influences, a fuel tank internal pressure adjusts in the fuel tank in correlation with the vapor pressure of the fuel. When the fuel tank internal pressure reaches or exceeds the typical pressure level and especially a defined maximum fuel tank internal pressure, the overflow valve opens to vent the fuel tank. A deactivated internal combustion is hereby to be understood as an internal combustion engine at a standstill whereas an activated internal combustion engine is to be understood as at least idling, in particular, as providing a torque.

When the internal combustion engine is deactivated, the fuel tank is normally vented exclusively by the fuel tank internal pressure. However, it is oftentimes the case that the permissible maximum fuel tank internal pressure varies with temperature, i.e. is therefore dependent there from. Especially when the internal combustion engine is deactivated and the fuel tank internal pressure can only decreased via the overflow valve, there may be a situation in which the fuel tank is subject to a fuel tank internal pressure which causes forces that exceed a strength of the fuel tank. This leads, for example, to unacceptable flow behavior or to unwanted, irreversible deformations of the fuel tank, in particular of a fuel tank shell.

SUMMARY OF THE INVENTION

It is therefore an object of the invention to propose a method of operating a fuel system of an internal combustion engine to obviate the mentioned disadvantages, while yet enabling a reliable operation of the fuel system, particularly when the internal combustion engine is deactivated.

This is achieved according to the invention by ascertaining the magnitude of deformation caused by a deformation of a deformation zone as a result of an internal pressure of the fuel tank, and by opening the vent valve when the magnitude of deformation exceeds a limit value. The fuel tank thus has the deformation zone which is in particular part of the fuel tank shell. The deformation zone is sized to buckle or deform in dependence on the internal pressure of the fuel tank. An increase in the fuel tank internal pressure causes, for example, deformation of the deformation zone to the outside. The higher the fuel tank internal pressure or the difference between the fuel tank internal pressure and the external pressure outside the fuel tank, the greater the deformation of the deformation zone. Provision is now made to ascertain the extent of deformation in the form of the magnitude of deformation. The magnitude of deformation is, for example, equal to zero when the fuel tank internal pressure substantially corresponds to the external pressure and thus there is no deformation of the deformation zone. When, however, the fuel tank internal pressure rises in relation to the external pressure, the deformation zone is urged outwards so that a magnitude of deformation greater than zero is encountered. Conversely, a decrease in the fuel tank internal pressure may, of course, result in an inward deformation of the deformation zone because the fuel tank internal pressure is lower than the external pressure.

In order to prevent the presence of an excessive fuel tank internal pressure, the vent valve is opened when the magnitude of deformation exceeds the limit value. The vent valve or the ventilation device allows in this case for gaseous fuel in particular to escape the fuel tank, preferably in the direction of the fuel accumulator or the internal combustion engine. This procedure can reliably prevent the presence of an excessive fuel tank internal pressure, especially also when the internal combustion engine is deactivated. Opening of the vent valve as a function of the magnitude of deformation has the advantage that the vent valve is not only opened as a result of the fuel tank internal pressure, but that at the same time the temperature of the fuel tank or its effect on the yield strength of the material from which the fuel tank is made, is taken into account. Thus, when the temperature is elevated but the pressure stays the same, due to temperature-dependent material properties, the deformation zone deforms to a greater degree compared to a lower temperature. At a higher temperature, the magnitude of deformation therefore reaches values more rapidly at which the fuel tank is deformed not only elastically, i.e. reversible, but rather plastically, i.e. irreversibly. A plastic deformation of the fuel tank or of regions of the fuel tank causes, however, damage, which necessitates, at least in some cases, a replacement of the fuel tank. The method according to the invention reliably prevents, however, the presence of excessive deformation.

According to a refinement of the invention, the deformation of the deformation zone is transmitted mechanically to the vent valve so that the deformation causes a force to open the vent valve. For example, a force transmitting element is arranged between the deformation zone and the vent valve such that the deflection of the deformation zone, encountered during deformation, is transmitted via the force transmitting element to the vent valve. The force transmitting element may, for example, be a rod, in particular a coupling rod, or the like. The force transmitting element is preferably mounted in a guide, wherein either a longitudinally movable or rotatable mounting of the force transmitting element may be provided.

According to a refinement of the invention, the magnitude of deformation can be ascertained by a sensor, and the vent valve can be opened by a control unit connected to the sensor. Instead of the afore-described mechanical transmitting of the deformation, an electric transmitting may be provided. For this purpose, the sensor is provided on the deformation zone for ascertaining the magnitude of deformation. The magnitude of deformation is evaluated by the control unit. The control unit is preferably different from the control unit of the internal combustion engine so that the control unit provided here is not deactivated when the internal combustion engine is deactivated, but rather continues to operate. A determination by the control unit that the magnitude of deformation exceeds the limit value triggers the opening of the vent valve. For this purpose, the vent valve is connected, for example, directly to the control unit, or is electrically connected thereto.

According to a refinement of the invention, the limit value is selected such that the deformation of the deformation zone is elastic, when the magnitude of deformation corresponds to the limit value. As already mentioned above, it is desirable when the deformation of the deformation zone or of the entire fuel tank is purely elastic and is not already plastic. A plastic deformation of the deformation zone or the fuel tank is equivalent to a damage of the fuel tank and usually requires replacement. The elastic deformation, however, is completely reversible so that a deformation does not cause damage of the fuel tank so long as the magnitude of deformation does not exceed the limit value. For this reason, the limit value is selected such that the deformation is purely elastic, even at maximum deformation, i.e. when the magnitude of deformation reaches the limit value. Preferably, the limit value has at a certain distance from the magnitude of deformation at which a plastic deformation of the deformation zone or the fuel tank would be encountered.

According to a refinement of the invention, the limit value is determined in dependence on an environmental condition, especially temperature. The environmental condition can affect the impact of the fuel tank internal pressure on the deformation or magnitude of deformation. It is therefore advantageous to determine the limit value as a function of the environmental condition, at which the fuel tank internal pressure, has the greatest effect on the deformation, i.e. in the presence thereof the magnitude of deformation has the highest value at a certain pressure. When using the sensor to ascertain the magnitude of deformation, the determination of the environmental condition can also be determined through measurement, in particular by a temperature sensor.

The invention further relates to a fuel system of an internal combustion engine, in particular for carrying out the method in accordance with the foregoing description, with the fuel system including a ventilation device, having a fuel tank and at least one vent valve, for ventilating the fuel tank. The fuel system is hereby designed to ascertain the magnitude of a deformation of a deformation zone of the fuel tank as a result of an internal pressure of the fuel tank, and to open the vent valve when the magnitude of deformation exceeds a limit value. In other words, the fuel system has respective means in order to proceed in the described manner. The fuel system can be further refined according to the above description.

According to a refinement of the invention, at least one stiffening element of the fuel tank is provided adjacent to the deformation zone. The fuel tank may have the one or also more stiffening elements which can be basically randomly arranged in the fuel tank. The stiffening element or the stiffening elements are provided to stiffen the fuel tank or the fuel tank shell thereof and thus to resist deformation. To ensure reliable operation of the ventilation device or vent valve, it is therefore necessary that there is no stiffening element in the deformation zone itself. Preferably, the at least one stiffening element is, however, placed adjacent to the deformation zone, so that the deformation zone is able to deform as a result of the internal pressure of the fuel tank, but not neighboring regions of the fuel tank.

According to a refinement of the invention, the ventilation device has a vent line which has one side in fluid communication with the fuel tank and another opposite side in fluid communication with the environment of the fuel tank or an air intake of the internal combustion engine, in particular via a filter. Ventilation of the fuel tank is provided via the vent line of the ventilation device. For this purpose, the vent line has one side which feeds into the fuel tank and another side which feeds either into the environment of the fuel tank or the air intake of the internal combustion engine. The filter is preferably provided on the fuel-tank-distal side of the vent line so as to be disposed in flow direction between the vent line and the environment or the air intake.

According to a refinement of the invention, the vent line includes the vent valve. Both the vent line and the vent valve are provided for ventilation of the fuel tank. For this purpose, the vent valve may, for example, be connected to the vent line on the fuel-tank-distal side of the vent line. Preferably, however, is a disposition of the vent valve in the vent line, i.e. integrated in the latter.

According to a refinement of the invention, the fuel tank, in particular the deformation zone, has at least one region made of plastic. Compared to other materials, plastic offers the advantage of being lightweight so as to be able to realize a significant weight reduction of the fuel tank in comparison to a fuel tank made for example of metal. When a fuel tank is made of plastic, there is, however, the problem that the plastic that is normally used is temperature-resistant only to a limited degree. When the fuel tank internal pressure is elevated and the temperature is high, for example, greater than or equal to 50° C., plastic, i.e. irreversible, deformations can occur in the absence of a reliable ventilation of the fuel tank, also when the internal combustion engine is deactivated. Preferably, the deformation zone is of a same material as other regions of the fuel tank, in particular fuel tank shell. Provision may, however, also be made for use of a different material for the deformation zone than for the other regions of the fuel tank. For example, the deformation zone can be made of a plastic and the other regions of the fuel tank can be made of a different plastic or a metal.

BRIEF DESCRIPTION OF THE DRAWING

The invention will now be explained in greater detail with reference to exemplary embodiments illustrated in the drawing, without limiting the invention. It is shown in.

DETAILED DESCRIPTION OF PREFERRED EMBODIMENTS

Figure 1:
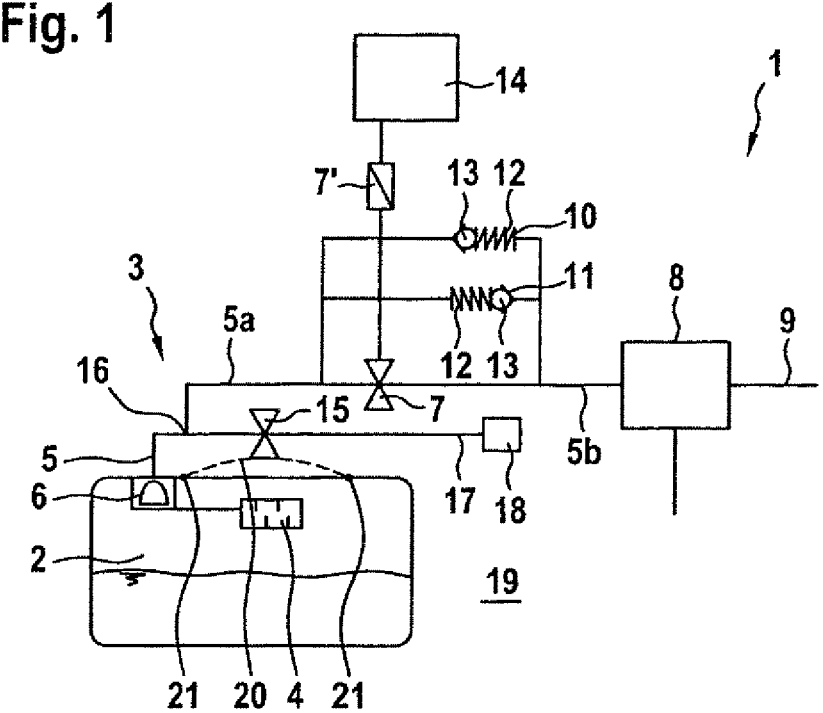
FIG. 1 a schematic illustration of a first embodiment of a fuel system of an internal combustion engine, having a ventilation device which includes at least one vent valve for ventilating a fuel tank, FIG. 2 a schematic illustration of a second embodiment of the fuel system, FIG. 3 a schematic illustration of a third embodiment of the fuel system, FIG. 4 a diagram in which a fuel tank temperature, a fuel tank internal pressure, a magnitude of deformation, and a adjustment variable of the vent valve are plotted over time, FIG. 5 a cross section through the fuel tank, with the latter including a deformation zone, FIG. 6 a detailed view of the fuel tank described with reference to FIG. 5, FIG. 7 a first embodiment of the vent valve, FIG. 8 a second embodiment of the vent valve, FIG. 9 a third embodiment of the vent valve, FIG. 10 a fourth embodiment of the vent valve in one position, FIG. 11 the embodiment of the vent valve disclosed in FIG. 10 in another position, FIG. 12 a fifth embodiment of the vent valve in the one position, FIG. 13 the vent valve disclosed in FIG. 12 in the other position, FIG. 14 a sixth embodiment of the vent valve, FIG. 15 a first possible arrangement of the vent valve, FIG. 16 a second possible arrangement of the vent valve, FIG. 17 a third possible arrangement of the vent valve, with the latter assuming the one position, FIG. 18 the arrangement of the vent valve disclosed in FIG. 17, with the latter assuming the other position, FIG. 19 a fourth possible arrangement of the vent valve, FIG. 20 a fifth possible arrangement of the vent valve, FIG. 21 a sixth possible arrangement of the vent valve, with the latter assuming the one position, FIG. 22 the arrangement of the vent valve disclosed in FIG. 21 with the latter assuming the other position, and FIG. 23 a transmitting device for the vent valve.

FIG. 1 shows a schematic illustration of a fuel system 1. The fuel system 1 is, for example, part of a motor vehicle or a drive system of the motor vehicle. The fuel system 1 has a fuel tank 2 and a ventilation device 3 for ventilating of the fuel tank 2. The ventilation device 3 may have a separator 4. The separator 4 is provided to separate liquid fuel from a mixture of liquid and gaseous fuels. The separated liquid fuel is then present in a buffer of the separator 4, and can, for example, be supplied again via a return line to the fuel tank 2. The return line preferably has a valve, especially a drain valve, preferably a check valve. Instead of the return line, only the valve may be provided, particularly when the separator 4 is provided, as in the present case, at least in part in the fuel tank 2 so that fuel exiting the buffer through the valve directly flows into the fuel tank 2. The valve is designed to enable fuel to exit the buffer through the return line, but not to enter it. In this way, fuel is prevented from flowing from the fuel tank 2 through the return line into the buffer.

The ventilation device 3 is connected via a vent line 5 in fluid communication with the fuel tank 2. A air valve 6 is provided on the side of the vent line 5 in facing relationship to the fuel tank 2 or in the fuel tank 2 and switches depending on the fuel tank fill level. The air valve 6 is optional, i.e. the fuel system 1 may also be configured without it. Typically, the air valve 6 is configured to open only when a fuel tank fill level is below a specified fuel tank fill level, in particular a maximum fuel tank fill level, i.e., in particular gaseous fuel, can enter the vent line 5 from the fuel tank 2. The vent line 5 has a first vent valve 7 which can be actuated by an actuator 7'. The vent valve 7 and the actuator 7' are preferably designed such that the flow cross section of the vent valve 7 is continuously adjustable. On the side facing away from the fuel tank 2, the vent line 5 feeds into a fuel accumulator 8, in particular a charcoal canister. The fuel accumulator 8 is used for temporarily storing gaseous fuel. The gaseous fuel can be supplied from the fuel accumulator 8 via a feed line 9 to the internal combustion engine or an intake region of the internal combustion engine (both not shown here).

Two overflow valves 10 and 11 are connected in parallel to the vent valve 7. The overflow valves 10 and 11 each have a spring-biased closing body 13 which is acted upon by a spring 12. The overflow valves are configured such as to allow opposite flow directions. The overflow valves 10 and 11 open or close in dependence on a pressure difference between a first section 5a of the vent line 5 on one side of the vent valve 7 and a second section 5b on the opposite side of the vent valve 7. The overflow valve 10 opens as soon as in the section 5a there is pressure which applies on the closing body 13 of the overflow valve 10 a force which is greater than a force caused by a pressure in the section 5b plus the spring force of the spring 12 of the overflow valve 10. The overflow valve 11 opens on the other hand, when the force caused by the pressure in the section 5b is greater than the force caused by the pressure in the section 5a plus the spring force of the spring 12 of the overflow valve 11. By using the overflow valves 10 and 11, the vent valve 7 can thereby be bypassed in the presence of a pressure which is too high on a side of the vent valve 7.

The vent valve 7 or the actuator 7' thereof is connected to a control unit 14. The control unit is in particular part of a motor control unit of the internal combustion engine or corresponds to this. The vent valve 7 is present in the form of a FTIV (Fuel Tank Isolation Valve), or is integrated therein. The FTIV is electronically adjustable by the control unit 14 for ventilating the fuel tank 2.

In addition to the first vent valve 7, the fuel system 1 has a second vent valve 15. The second vent valve 15 is also disposed in the vent line 5 or in a section 17 of the vent line 5 and is fluidly connected downstream of a branch 16 in parallel to the first vent valve 7. The branch 16 thus splits the vent line 5 into the section 5a and the section 17. The branch 16 is arranged downstream of the separator 4 and the vent valve 6. The section 17 in which the second vent valve 15 is disposed, feeds in the embodiment illustrated here via a filter 18 into an environment 19 of the fuel system 1 or the internal combustion engine.

The fuel tank 2 has at least one deformation zone 20 which is deformable when subjected to an internal pressure in the fuel tank 2. Provision is now made for configuring the fuel system 1 to ascertain the magnitude of deformation of the deformation of the deformation zone 20 and to open the second vent valve 15, when the magnitude of deformation exceeds a limit value. Preferably, the fuel tank 2 also has stiffening elements 21 which are arranged adjacent to the deformation zone 20 on or in the fuel tank 2. The stiffening elements 21 are provided to increase the stiffness of the fuel tank 2 in the regions which lie outside of the deformation zone 20. In this way, only a deformation of the deformation zone 20 is permitted but not of other regions of the fuel tank 2, when subject to the internal pressure of the fuel tank. In this case, the deformation zone 20 is advantageously configured of same material as the other regions of the fuel tank 2, and also has the same wall thickness. In an alternative embodiment, the deformation zone 20 can, of course, be formed from another, in particular softer material, in particular plastic, and/or of smaller wall thickness, so that the deformation of the deformation zone 20 occurs before deformation of other regions of the fuel tank 2.

In the embodiment illustrated here, the deformation of the deformation zone 20 is transmitted mechanically to the vent valve 15. Thus, the deformation causes a force that opens the vent valve 15. In an alternative embodiment, provision may also be made for ascertaining the magnitude of deformation by using a sensor (not shown) which interacts with the deformation zone 20. When the ascertained magnitude of deformation exceeds the limit value, the vent valve 15 is opened, for example, by the control device 14.

Figure 2:
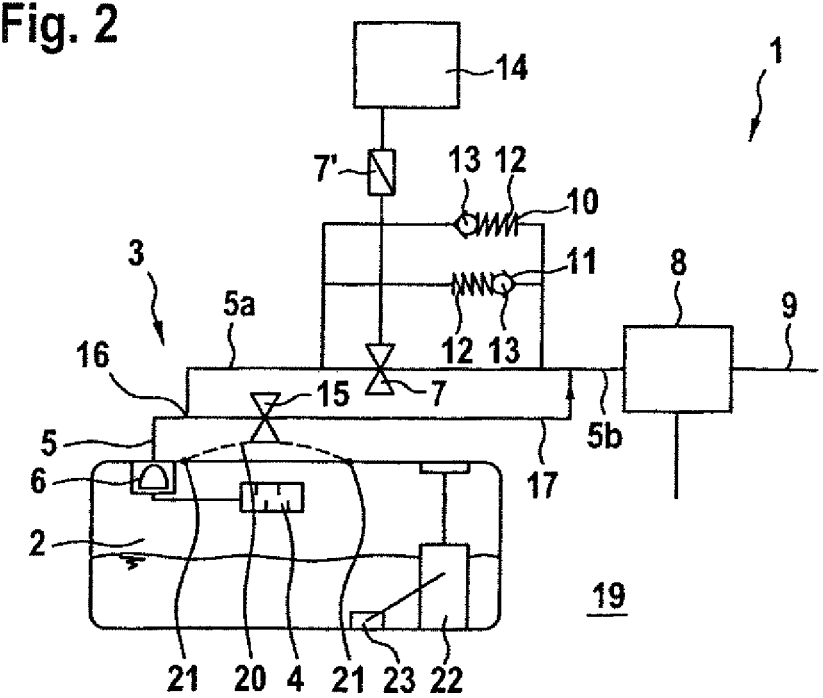

FIG. 2 shows a further embodiment of the fuel system 1. Shown here is an additional fuel pump 22 having a float 23, which, of course, are also present in the exemplary embodiment according to FIG. 1. The float 23 enables determination of the fuel tank fill level in the fuel tank 2 and respective control of the fuel pump 22. Otherwise, the fuel system 1 as shown in FIG. 2 largely corresponds to the one represented in FIG. 1. It differs only in the absence of the filter 18 in the section 17 which feeds downstream of the vent valve 15 into the section 5b of the vent line 5. Thus, a bypass of the first vent valve 7 becomes possible via the second vent valve 15, as well as with the overflow valves 10 and 11.

Figure 3:
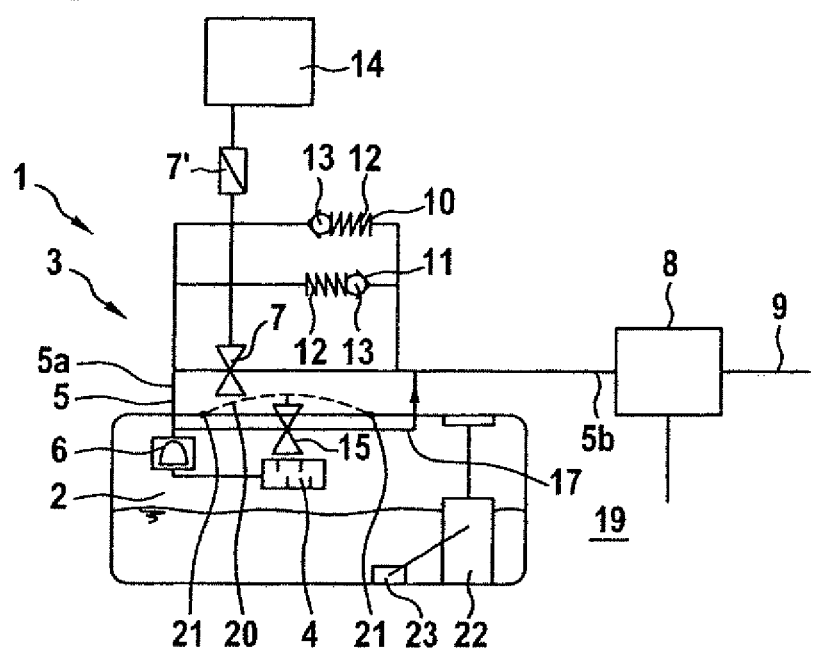

FIG. 3 shows a third embodiment of the fuel system 1. In the embodiments illustrated in FIGS. 1 and 2, the second vent valve 15 is disposed outside the fuel tank 2. The fuel system 1 according to the third embodiment substantially corresponds to the afore-described, the second vent valve 15 is, however, provided in the fuel tank 2.

Figure 4:
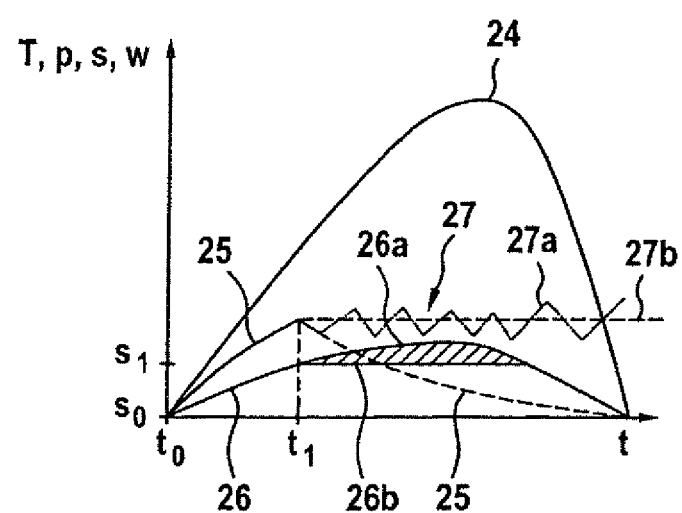

FIG. 4 shows a diagram in which a temperature T, the fuel tank internal pressure p, the magnitude of deformation s, and a adjustment path w of the vent valve 15 are plotted over time t purely by way of example. A graph 24 relates hereby to the temperature T, graph 25 to the fuel tank internal pressure p, graph 26 to the magnitude of deformation s, and graph 27 to the adjustment variable w of the vent valve 15. As can be seen, the temperature T and thus also the fuel tank internal pressure p rise starting from $t=t_0$. The fuel tank internal pressure p causes a deformation of the deformation zone 20 of the fuel tank 2. The deformation thus also increases starting from $t=t_0$ in accordance with the graph 26. At $t=t_1$, the deformation s reaches a limit value $s_1$. Absent a ventilation of the fuel tank 2, the deformation would continue to increase along the graph 26a and thus reach a value at which plastic deformation of the fuel tank 2 can be experienced to cause damage thereof. Provision is thus made to open the second vent valve 15, when the magnitude of deformation s reaches or exceeds the limit value $s_1$. For this purpose, vent valve 15 is controlled by the adjustment variable w, wherein (in accordance with graph 27a) a pure opening or closing, or alternatively (corresponding to graph 27b) a proportional opening of the vent valve 15 is provided. In this way, the pressure p drops as of $t=t_1$ according to the graph 25 so that the deformation s according to graph 26b either remains the same or even decreases again. In this way, the fuel tank 2 is protected from damage as a result of the internal pressure prevailing in the fuel tank 2 or deformation caused by internal pressure.

Figure 5:
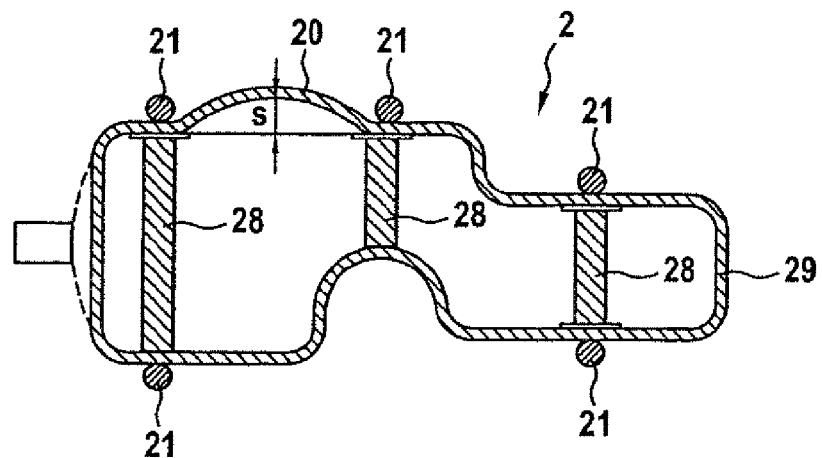

FIG. 5 shows a cross section through the fuel tank 2 which, as clearly shown, includes several stiffening elements 21 or support elements 28. The deformation zone 20 is placed hereby between two stiffening elements 21 and two support elements 28. The stiffening elements 21 and the support elements 28 interact to prevent or at least reduce a deformation of regions of the fuel tank 2 or a fuel tank shell 29 outside the deformation zone 20. Only indicated in FIG. 5 is the magnitude of deformation s of a deformation which already happened in the deformation zone 20.

Figure 6:
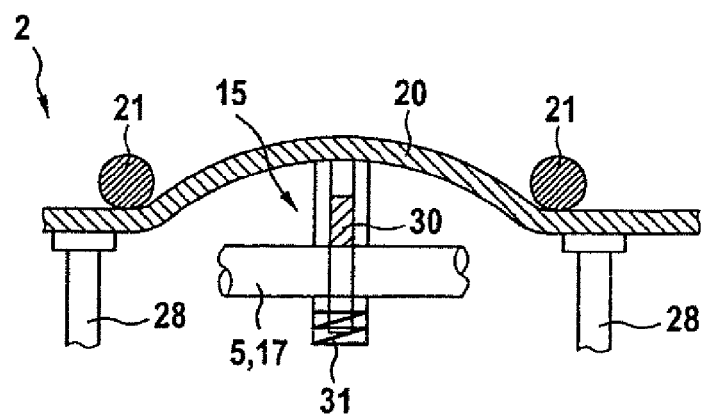

FIG. 6 shows a detailed view of the deformation zone 20 of the fuel tank 2 disclosed in FIG. 5. As is clearly shown, the second vent valve 15, arranged in the fuel tank 2, interacts with the deformation zone 20 in order to clear or block the vent line 5 or the section 17 thereof. For this purpose, the vent valve 15 has a gate 30 which acts as cross-sectional adjustment element in the vent line 5 and causes an increment blockage of the vent line 5 or the section 15 as the magnitude of deformation s increases. The gate 30 interacts with a return element 31 to clear again the vent line 5 as soon as the deformation of the deformation zone 20 decreases, i.e. the magnitude of deformation s becomes smaller.

Figure 7:
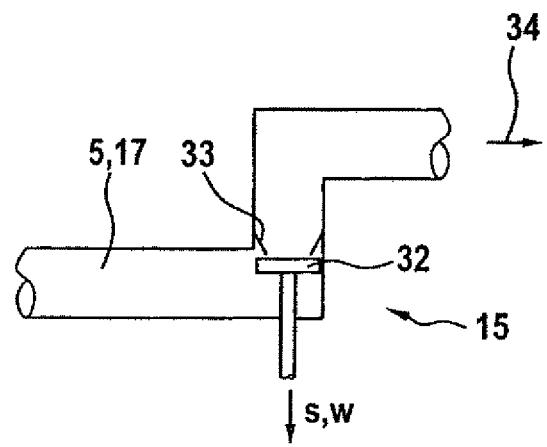

FIG. 7 shows a schematic illustration of a first embodiment of the second vent valve 15. The vent valve 15 includes a plunger 32 and a valve seat 33 interacting with the plunger. The plunger 32 is operated in dependence on the magnitude of deformation s with a respective adjustment path w, wherein in the presence of a direct mechanical coupling of the vent valve 15 with the deformation zone 20, the adjustment variable w may correspond to the magnitude of deformation. In the event, the deformation zone 20 is not deformed, i.e. the magnitude of deformation is equal to zero, the plunger 32 rests snugly against the valve seat 33 so that the vent valve 15 is closed. As the magnitude of deformation s increases or when the limit value is reached, also the adjustment variable w is increased so that the plunger 32 is lifted from the valve seat 33 and allows flow through the vent valve 15. The flow direction of the vent valve 15 or the vent line 5 is indicated by arrow 34.

Figure 8:
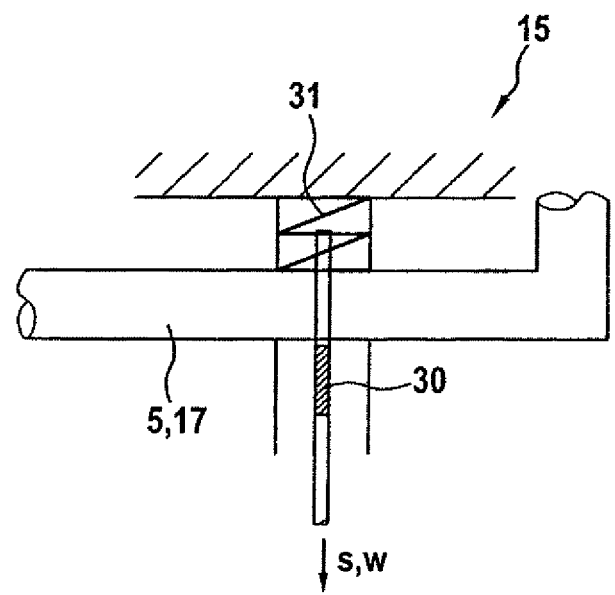

FIG. 8 shows a second embodiment of the vent valve 15. The latter is substantially disclosed in FIG. 6. The gate 30, which is placed in the vent line 5 or the section 17 thereof in dependence on the magnitude of deformation s is provided in order to clear or block the flow cross section. The vent valve 15 includes hereby the return element 31, which is implemented for example in the form of a helical spring.

Figure 9:
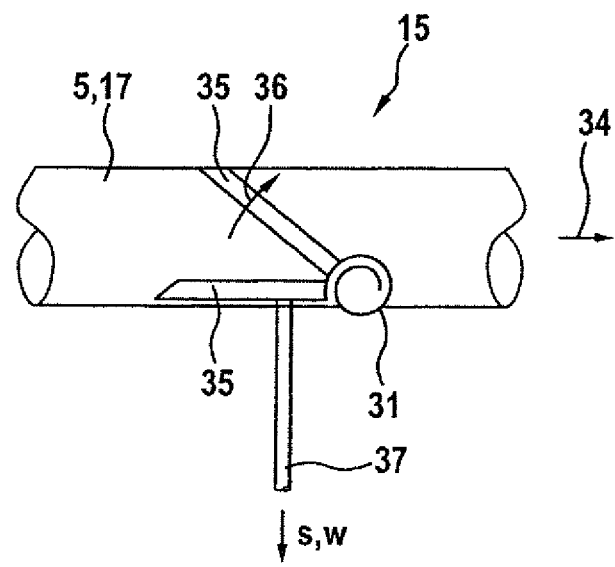

FIG. 9 shows a third embodiment of the vent valve 15. The latter includes a rotatably mounted flap 35 which is shown in FIG. 9 in a position clearing the vent line 5 and a position blocking the latter. The flap 35 is constantly urged by the return element 31 in the direction of arrow 36, i.e. in the position in which the vent line 5 is blocked. An actuator 37 is mounted on the flap 35 and causes a displacement of the flap 35 in the direction of the position in which the vent line 5 is, at least in part, cleared as the magnitude of deformation s increases or when the limit value is reached.

Figure 10:
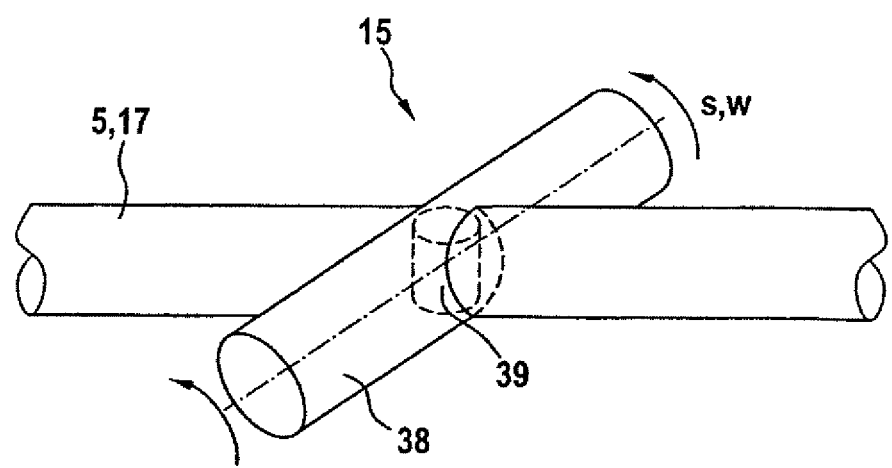

FIG. 10 shows a fourth embodiment of the vent valve 15 in the position in which the vent line 5 is not cleared. The position here shows the drum gate 38 when the deformation zone 20 is not deformed, i.e. the magnitude of deformation s is substantially equal to zero or less than the limit value. As the magnitude of deformation s increases, in particular from when the limit value is reached, the drum gate 38 is brought incrementally into the position shown in the FIG. 11.

Figure 11:
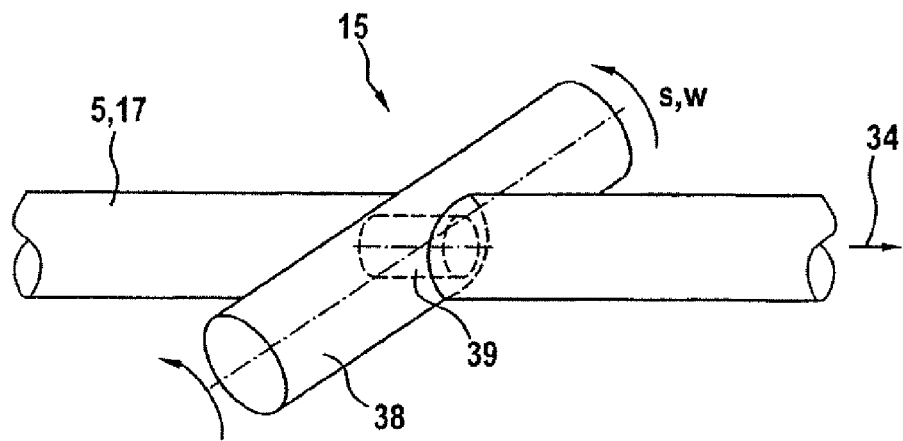

FIG. 11 shows the embodiment of the vent valve 15 of FIG. 10 in the position in which the vent line 5 is completely cleared. For this purpose, a drum gate 38, which has a through opening 39, is arranged such that fluid in the vent line fluid 5 is able to flow through the through opening 39. In particular, the through opening lies coaxially with respect to the area of the vent line 5, in which the drum gate 38 is situated.

Figure 12:
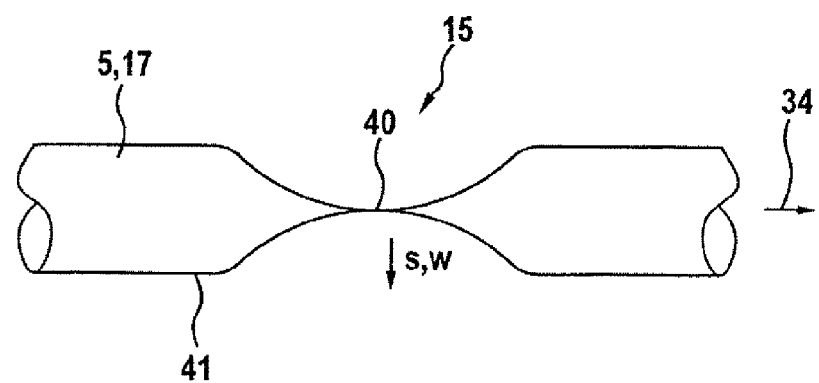

FIG. 12 shows a fifth embodiment of the vent valve 15 in the position in which the vent line 5 is substantially blocked. The vent valve 15 includes hereby essentially a changeable cross-sectional region 40 in which a wall 41 of the vent line 5 is formed flexibly. By deforming the wall 41 in the changeable cross-sectional region 40, the flow cross-section of the vent line 5 can be adjusted. The flow cross-section should hereby be greater, the greater the magnitude of deformation s is. It is of advantage in the embodiment illustrated here, when the wall 41 in the changeable cross-sectional region 40 is elastic so that an elastic force caused by a wall 41 causes the shown cross-sectional decrease up to a complete closing of the vent valve 15.

Figure 13:
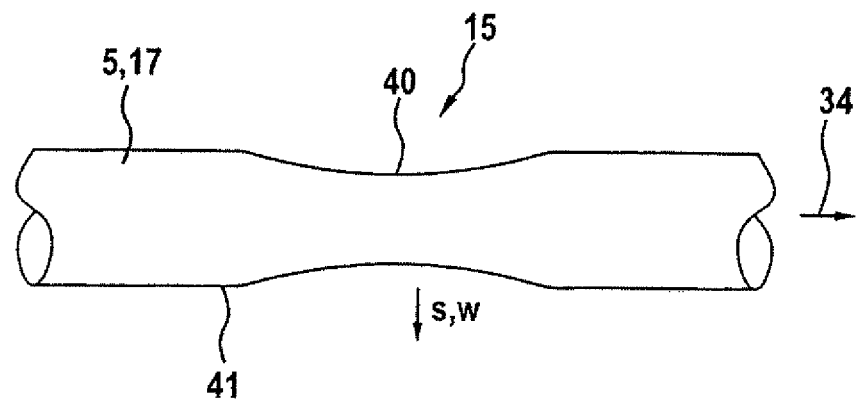

FIG. 13 shows the embodiment of the vent valve 15 disclosed in FIG. 12 in the position in which the vent line 5 is at least partially cleared.

Figure 14:
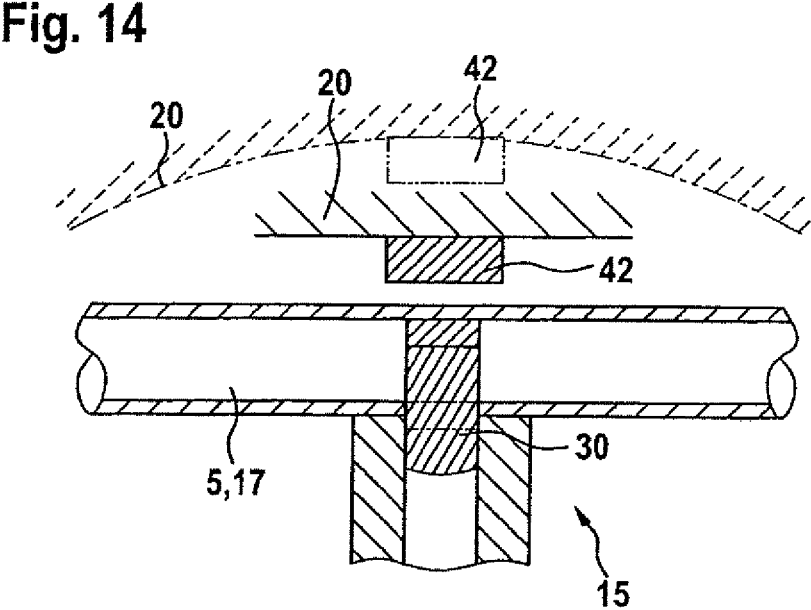

FIG. 14 shows a sixth embodiment of the vent valve 15. In this embodiment, again a gate 30 is provided to allow interruption of the vent line 5. The gate 30 is arranged adjacent to the deformation zone 20. Secured to the deformation zone 20 is a magnet 42, in particular permanent magnet. When the deformation of the deformation zone 20 increases, the magnet 42, as indicated, is moved away from the vent valve 15. In the initial position of the magnet 42, in which the deformation zone 20 is not or only slightly deformed, its force is sufficient to attract the gate 30, which is made of a magnetic or magnetizable material and arranged such that the vent line 15 is blocked. In the presence of the deformation of the deformation zone 20, the magnet 42 is disposed further away from the vent valve 5, so that its force is no longer sufficient to counteract an opposing force acting on the gate 30. The opposing force is, for example, realized by the influence of gravity or by the return element 31 (not shown here). When the force of the magnet 42 is no longer sufficient to position the gate 30 for closing the vent line 5, the latter is cleared.

Figure 15:
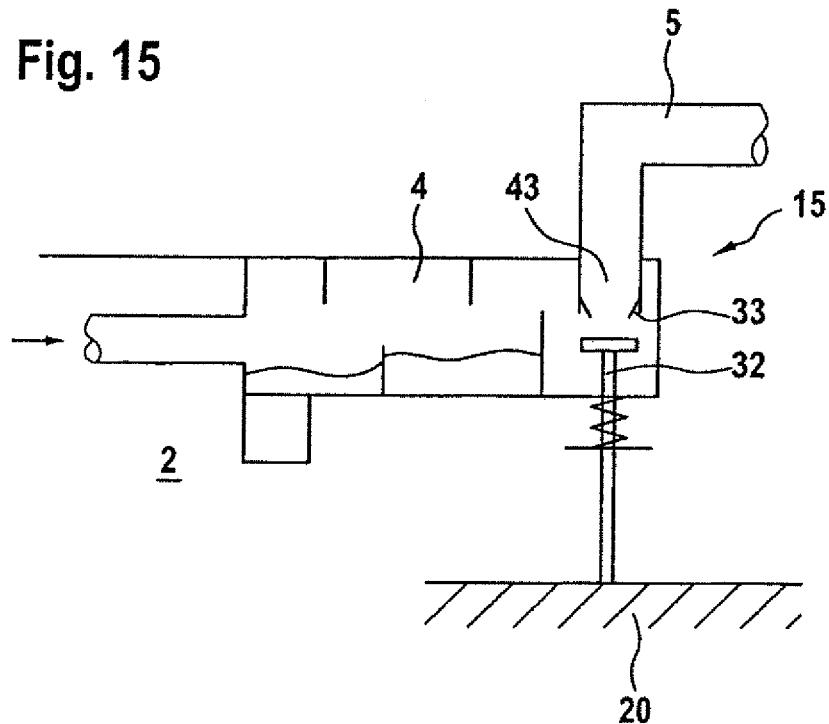

FIG. 15 shows a first arrangement of the vent valve 15 which is integrated in the separator 4. More specifically, the vent valve 15 is used to clear or close an outlet 43 of the separator 4. For this purpose, the valve seat 33 is provided on the outlet 43, while the plunger 32 is operatively connected to the deformation zone 20. The illustrated embodiment of the vent valve 15 with the plunger 32 and the valve seat 33 is to be understood purely by way of example. In principle, all afore-described embodiments can be integrated in the separator 4. In such an arrangement, it is advantageous when the vent valve 15 is disposed in a vent line (not shown here) separate from the vent line 15.

Figure 16:
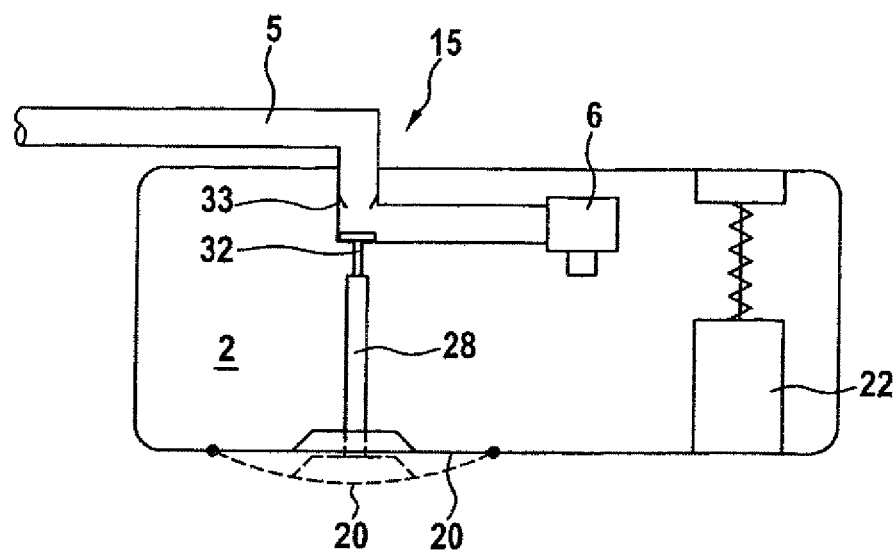

FIG. 16 shows a second arrangement of the vent valve 15. In this arrangement, the vent valve 15 is connected via one of the support elements 28 to the deformation zone. Here again, the first embodiment of the vent valve 15 is shown with plunger 32 and valve seat 33, although also the other embodiments can be operably connected via the support element 28 with the deformation zone 20.

Figure 17:
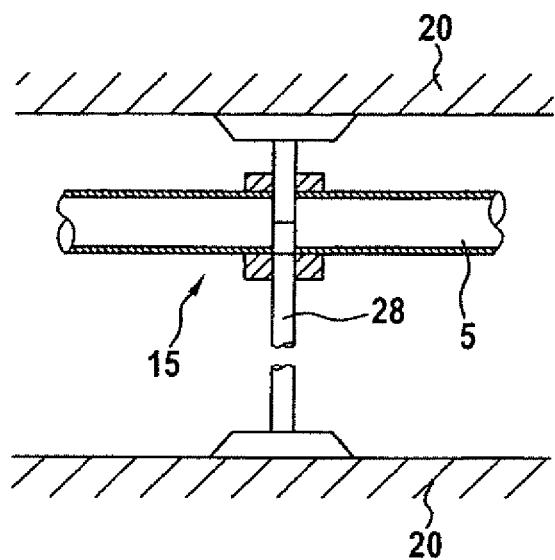
Figure 18:
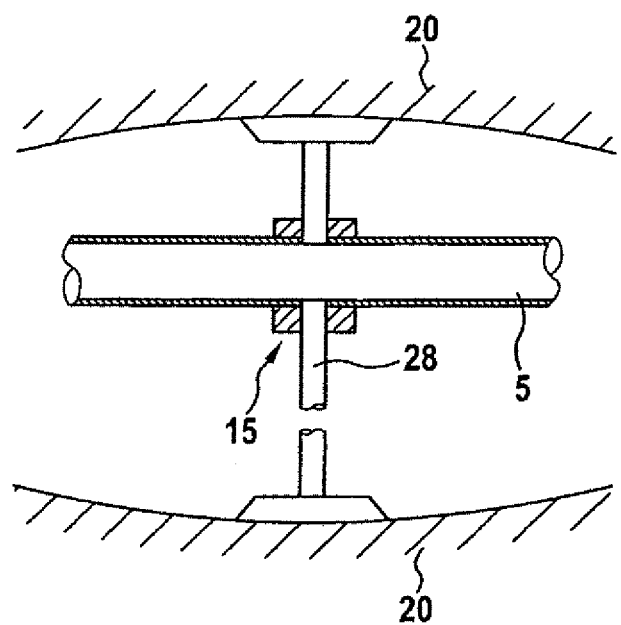

FIG. 17 shows a third arrangement of the vent valve 15 which is shown in its first, closed position. Two opposing deformation zones 20 are connected to one another by the support element 28. As an alternative, a single deformation zone may also be provided only on one side 20. Upon deformation of the deformation zone 20 or the two deformation zones 20, the deformation is initially permitted by the support element 28. The vent valve 15 is hereby integrated with the support element 28 in such a way that the vent line 5 is cleared during deformation of the deformation zones 20. This is shown in FIG. 18. As soon as the vent valve 15 is fully open, the support element 28 forms an end stop for the deformation of the deformation zones 20. The support element 28 bars therefore any further deformation of these zones. The support element 20 establishes a maximum deformation and subsequently supports the fuel tank 2 or its deformation zones 20 against one another so that no or only a reduced additional deformation can take place. This arrangement allows for a combination with the afore-described embodiments of the vent valve 15.

Figure 19:
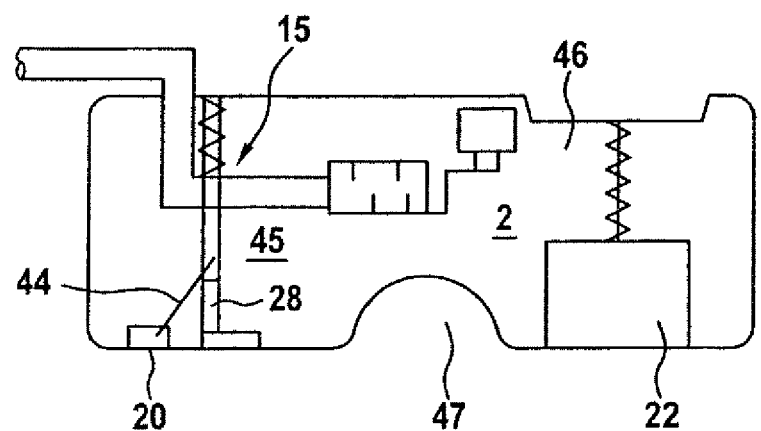

FIG. 19 shows a fourth arrangement of the vent valve 15 which is arranged on the support element 28 or integrated therein. The support element 28 is rigid, i.e. it does not allow any deformation. For this reason, the vent valve 15 is operatively connected via an actuator 44 with the deformation zone 20 placed adjacent to the support element 28. Both the support element 28 and the vent valve 15 are disposed in a sub-chamber 45 of the fuel tank 2, while the fuel pump 22 is provided in a main chamber 46. The main chamber 46 is separated in areas of the sub-chamber 45 by a web 47. Here, too, a combination of all the afore-described embodiments of the vent valve 15 is possible.

Figure 20:
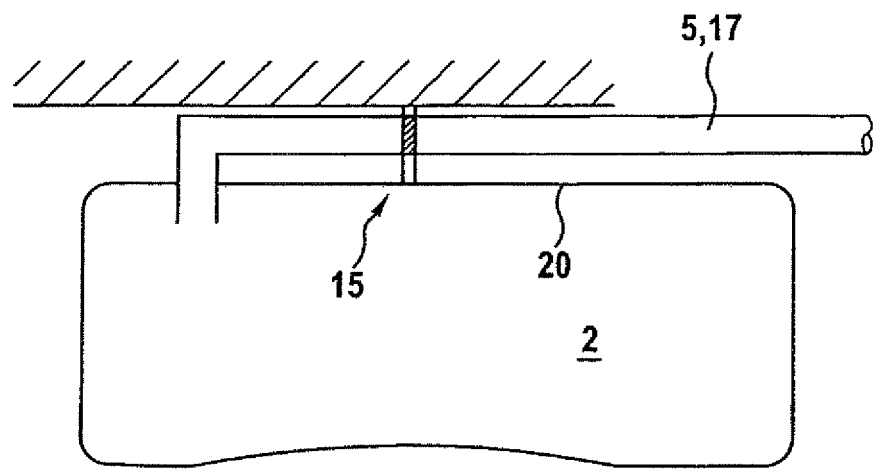

FIG. 20 shows a fifth arrangement of vent valve 15 outside of the fuel tank 2. As already described above, the vent valve is operatively connected with the deformation zone 20 of the fuel tank 2 to clear the vent line 15 or the section 17 as soon as the magnitude of deformation of the deformation exceeds the limit value. Again, a combination with all the afore-described embodiments of the vent valve 15 can be realized.

Figure 21:
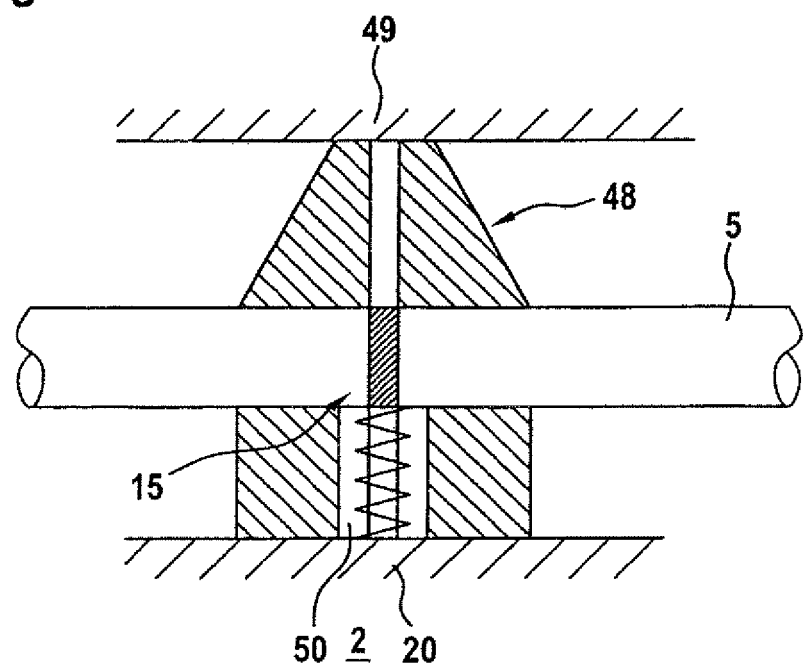

FIG. 21 shows a sixth arrangement of the vent valve 15 outside of the fuel tank 2 and integrated in a holding module 48 which secures the fuel tank 2 to a body 49 of a motor vehicle. The deformation zone 20 is provided here, for example, in the region of a recess 50 of the holding module 48. In this recess 50, the operative connection between the vent valve 15 and the deformation zone 20 is present. This arrangement also permits a combination with all afore-described embodiments of the vent valve 15.

Figure 22:
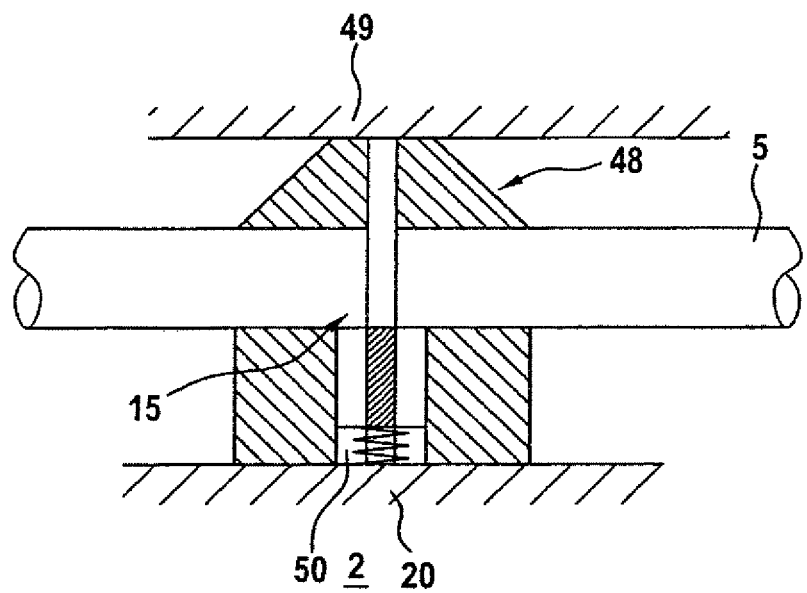

FIG. 22 shows the arrangement of the vent valve 15 of FIG. 21, with the latter assuming the position in which the vent line 5 is substantially completely cleared.

Figure 23:
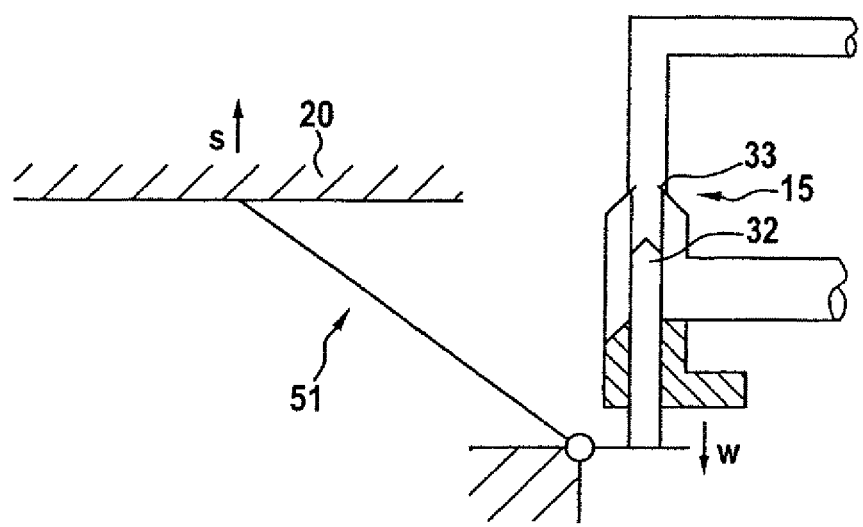

FIG. 23 shows by way of example a travel transmitting device 51 disposed between the deformation zone 20 and the vent valve 15. The latter is here again shown, purely by way of example, with plunger 32 cooperating with the valve seat 33. The travel transmitting device 51 is, for example, designed such that the magnitude of deformation s is converted into a smaller adjustment variable w. As an alternative, a reverse configuration is also possible, in which the magnitude of deformation s causes a greater adjustment path w.

LIST OF REFERENCE SIGNS

1 fuel system
2 fuel tank
3 ventilation device
4 separator
5 vent line
6 air valve
7 1. vent valve
8 fuel accumulator
9 feed line
10 overflow valve
11 overflow valve
12 spring
13 closing body
14 control unit
15 2 vent valve
16 branch
17 section
18 filter
19 environment
20 deformation zone
21 stiffening element
22 fuel pump
23 float
24 graph T
25 graph p
26 graph s
27 graph w
28 support element
29 fuel tank shell
30 gate
31 return element
32 plunger
33 valve seat
34 arrow
35 flap
36 arrow
37 actuator
38 drum gate
39 through opening
40 change in cross-sectional region
41 wall
42 magnet
43 outlet
44 actuator
45 sub-chamber
46 main chamber
47 web
48 holding module
49 body
50 recess
51 travel transmitting device

What is claimed is:

1. A method of operating a fuel system of an internal combustion engine, comprising:
   fluidly connecting a ventilation device of the fuel system via a vent line with a fuel tank of the fuel system for ventilation of the fuel tank;
   providing an actuator for actuating a first vent valve of the ventilation device;
   connecting in parallel to the first vent valve two overflow valves configured to enable opposite throughflow directions and to open or close a throughflow in dependence on a pressure differential between a first section of the vent line on one side of the first vent line and a second section on an opposite side of the first vent valve;
   ascertaining a magnitude of deformation of a deformation zone of the fuel tank as caused by an internal pressure of the fuel tank;
   opening a second vent valve of the ventilation device when the magnitude of deformation exceeds a limit value; and mechanically transmitting the deformation of the deformation zone to the second vent valve so that the deformation causes a force to open the second vent valve.

2. The method of claim 1, further comprising selecting the limit value such that the deformation of the deformation zone is elastic when the magnitude of deformation is equal to the limit value.

3. The method of claim 1, further comprising determining the limit value in dependence on a environmental condition.

4. The method of claim 1, further comprising determining the limit value in dependence on a temperature.

5. A fuel system of an internal combustion engine, comprising:
- a fuel tank;
- a ventilation device for ventilating the fuel tank, said ventilation device including first and second vent valves, and a vent line in fluid communication with the fuel tank;
- an actuator configured to actuate the first vent valve; and
- two overflow valves connected in parallel to the first vent valve and configured to enable opposite throughflow directions and to open or close a throughflow in dependence on a pressure differential between a first section of the first vent line on one side of the vent line and a second section on an opposite side of the first vent valve;
- wherein a magnitude of deformation of a deformation zone of the fuel tank as caused by an internal pressure of the fuel tank is ascertained and the second vent valve of the ventilation device is opened when the magnitude of deformation exceeds a limit value, wherein the deformation of the deformation zone is mechanically transmitted to the second vent valve so that the deformation causes a force to open the second vent valve.

6. The fuel system of claim 5, wherein the fuel tank has at least one stiffening element adjacent to the deformation zone.

7. The fuel system of claim 5, wherein the vent line has one side in fluid communication with the fuel tank and another opposite side in fluid communication with an environment of the fuel tank or an air intake of the internal combustion engine.

8. The fuel system of claim 5, further comprising a filter disposed in the fluid communication.

9. The fuel system of claim 5, wherein the fuel tank is made, at least in part, of plastic.

10. The fuel system of claim 5, wherein the deformation zone is made, at least in part, of plastic.

\* \* \* \* \*